(12) United States Patent
Fishman et al.

(10) Patent No.: US 9,306,832 B2
(45) Date of Patent: Apr. 5, 2016

(54) VIRTUALIZED NETWORK FOR VIRTUALIZED GUESTS AS AN INDEPENDENT OVERLAY OVER A PHYSICAL NETWORK

(71) Applicant: RAVELLO SYSTEMS LTD., Ra'anana (IL)

(72) Inventors: Alexander Fishman, Netanya (IL); Gil Hoffer, Tel-Aviv (IL); Rami Tamir, Even Yehuda (IL); Benny Schnaider, Ra'anana (IL)

(73) Assignee: Ravello Systems Ltd., Raanana (IL)

( * ) Notice: Subject to any disclaimer, the term of this patent is extended or adjusted under 35 U.S.C. 154(b) by 216 days.

(21) Appl. No.: 13/773,142

(22) Filed: Feb. 21, 2013

(65) Prior Publication Data

US 2013/0227107 A1    Aug. 29, 2013

Related U.S. Application Data

(60) Provisional application No. 61/603,387, filed on Feb. 27, 2012.

(51) Int. Cl.

| H04L 12/28 | (2006.01) |
|---|---|
| H04L 12/701 | (2013.01) |
| H04L 12/24 | (2006.01) |
| H04L 12/801 | (2013.01) |
| H04L 12/931 | (2013.01) |
| H04L 12/715 | (2013.01) |
| H04L 12/721 | (2013.01) |

(52) U.S. Cl.
CPC ............... *H04L 45/00* (2013.01); *H04L 41/50* (2013.01); *H04L 45/64* (2013.01); *H04L 45/66* (2013.01); *H04L 47/10* (2013.01); *H04L 49/70* (2013.01); *H04L 41/12* (2013.01)

(58) Field of Classification Search
USPC .................. 370/389, 254, 390, 386; 709/223
See application file for complete search history.

(56) References Cited

U.S. PATENT DOCUMENTS

| 4,792,948 | A | 12/1988 | Hangen et al. |
|---|---|---|---|
| 5,781,715 | A | 7/1998 | Sheu |
| 5,848,227 | A | 12/1998 | Sheu |
| 6,356,546 | B1 | 3/2002 | Beshai |
| 6,580,721 | B1 | 6/2003 | Beshai |
| 6,704,318 | B1 | 3/2004 | Stuart et al. |
| 6,876,652 | B1 | 4/2005 | Bell et al. |
| 7,039,046 | B1 | 5/2006 | Simons et al. |
| 7,054,325 | B1 | 5/2006 | Archibald |
| 7,295,519 | B2 | 11/2007 | Sandy et al. |
| 7,310,349 | B2 | 12/2007 | Beshai |
| 8,619,771 | B2 * | 12/2013 | Lambeth et al. ............. 370/389 |
| 2002/0009078 | A1 * | 1/2002 | Wilson et al. ................ 370/389 |
| 2005/0180410 | A1 | 8/2005 | Pepenella |

(Continued)

*Primary Examiner* — Kyung H Shin
(74) *Attorney, Agent, or Firm* — M&B IP Analysts, LLC

(57) ABSTRACT

A method for operating a virtualized network that communicatively connects between a plurality of communication ports, instantiated for a plurality of guest operating systems executed over a plurality of hosts. The method comprises instantiating a communication port for each of the plurality of guests; performing a discovery media access control (MAC) address process of at least one destination guest of the plurality of guests by a source guest; sending a ping request from the source request to the at least one destination guest; and creating the virtualized network to allow communication between the source guest with the at least one destination guest, wherein the virtualized network is created over the physical network.

26 Claims, 2 Drawing Sheets

(56) References Cited

U.S. PATENT DOCUMENTS

| | | |
|---|---|---|
| 2006/0039369 A1 | 2/2006 | Perera et al. |
| 2007/0076719 A1 | 4/2007 | Allan et al. |
| 2007/0086364 A1 | 4/2007 | Ellis et al. |
| 2008/0049644 A1* | 2/2008 | Halbert .......................... 370/254 |
| 2009/0293055 A1 | 11/2009 | Carroll et al. |

* cited by examiner

VIRTUALIZED NETWORK FOR VIRTUALIZED GUESTS AS AN INDEPENDENT OVERLAY OVER A PHYSICAL NETWORK

CROSS-REFERENCE TO RELATED APPLICATIONS

This application claims the benefit of U.S. Provisional Patent Application No. 61/603,387, filed on Feb. 27, 2012, which is assigned to common assignee and is hereby incorporated by reference for all that it contains.

TECHNICAL FIELD

The invention generally relates to virtual machines (VMs), and more specifically to network switching in a virtualized network environment.

BACKGROUND

Communication between devices over a network is a well-established technology that has been around in one form or another for decades. In one manifestation, a network having various protocols is used that enables the delivery of packets of data from a source to a destination through various communication elements such as switches and routers.

Basically, a star topology is used with respect of the communication of the various devices through a switch. That is, all the devices are connected to a switch, which has an internal logic that then switches the packets to the desired direction. Hence, if a device A wishes to send a packet to a device B, a packet is sent to a switch which includes the network address of device B. The switch then routes the packet that was received by the switch to the device B being the packet's destination. Naturally more complex architectures may be used with this respect, but the basic concept is this kind of routing.

With the advance of virtual machines (VMs), it is also necessary to have network communication occurring between VMs. A VM is an operating environment that executes over a computing hardware with its own guest operating system (OS), at times simply referred to as a guest. A VM can execute applications that run within the confines of its respective OS. Currently, for the purpose of communication between VMs, and in particular between guests, the virtual environment mimics the physical environment by having a central switch, to which all packets of data that need to be transferred are routed, and that has the necessary logic to send the packets to the appropriate destinations. However, in the virtualized environment such a centralized implementation results in unnecessary overhead and complexity as well as a balancing issue, or even a need to dedicate a separate VM for the sole purpose of switching.

It would be therefore advantageous to provide a solution that overcomes the deficiencies of centralized communication between guests of VMs in a virtual environment.

SUMMARY

Certain exemplary embodiments disclosed herein include a method for operating a virtualized network that communicatively connects between a plurality of communication ports, instantiated for a plurality of guest operating systems executed over a plurality of hosts. The method comprises instantiating a communication port for each of the plurality of guests; performing a discovery media access control (MAC) address process of at least one destination guest of the plurality of guests by a source guest; sending a ping request from the source request to the at least one destination guest; and creating the virtualized network to allow communication between the source guest with the at least one destination guest, wherein the virtualized network is created over the physical network.

Certain exemplary embodiments disclosed herein also include a system for enabling effective communicating over cloud-based infrastructures. The system comprises a first host operative in a first cloud-based infrastructure, wherein the first host executes a first guest operating system; a first communication port instantiated for the first guest; a second host operative in a second cloud-based infrastructure, wherein the second host executes a first guest operating system; and a second communication port instantiated for the second guest; wherein the first host and second host are communicatively connected through a physical network, wherein the first communication port and the second communication port are communicatively connected to constitute a distributed communication element that enables a virtualized network for communication between the first guest and the second guest via the first communication port and the second communication port respectively.

Certain exemplary embodiments disclosed herein also include a distributed network element. The element comprises a plurality of communication ports instantiated for a plurality of guest operating systems executed over a plurality of hosts, wherein the plurality of hosts are communicatively connected to a physical network, and wherein the plurality of communication ports enable establishment of a virtualized network between the plurality of guests.

BRIEF DESCRIPTION OF THE DRAWINGS

The subject matter that is regarded as the invention is particularly pointed out and distinctly claimed in the claims at the conclusion of the specification. The foregoing and other objects, features, and advantages of the invention will be apparent from the following detailed description taken in conjunction with the accompanying drawings.

DETAILED DESCRIPTION

Figure 1:
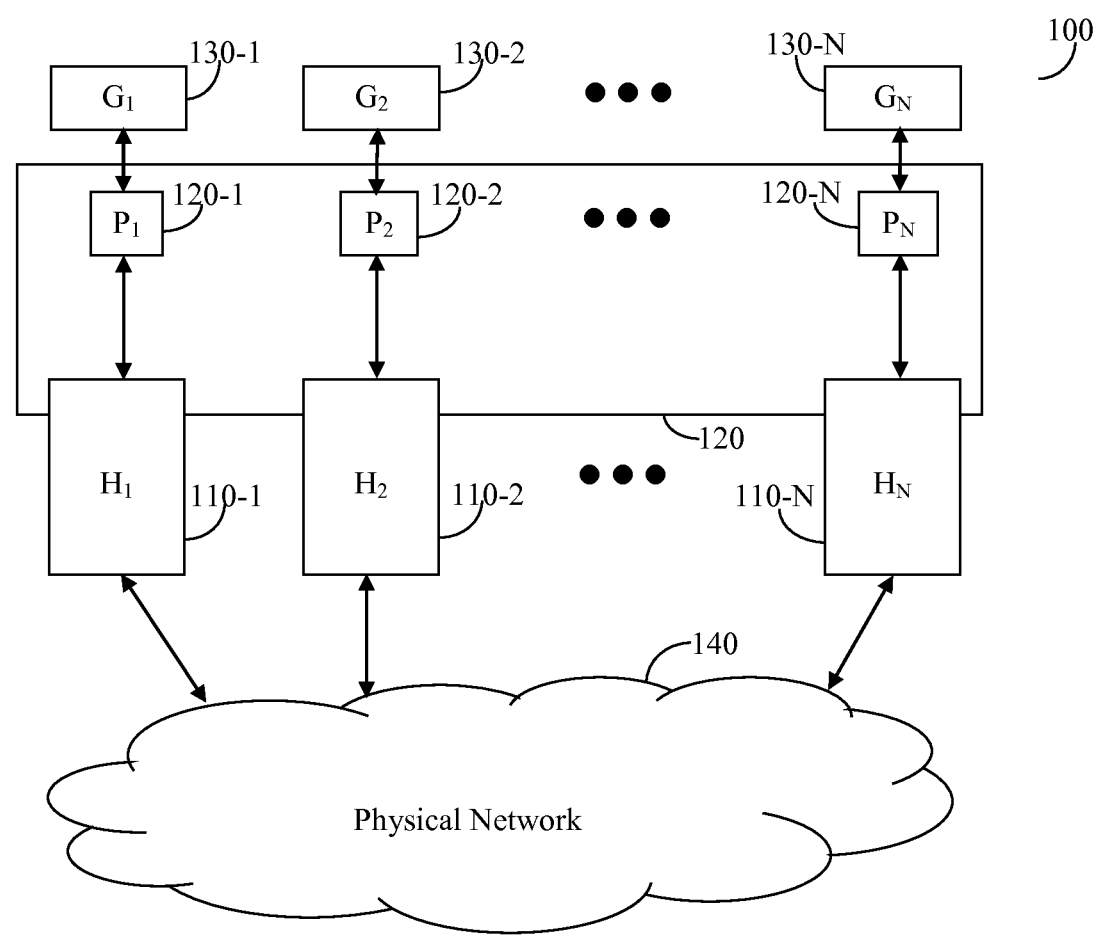
FIG. 1 is a schematic diagram of an embodiment of a system having a distributed switch according to one embodiment.

The embodiments disclosed by the invention are only examples of the many possible advantageous uses and implementations of the innovative teachings presented herein. In general, statements made in the specification of the present application do not necessarily limit any of the various claimed inventions. Moreover, some statements may apply to some inventive features but not to others. In general, unless otherwise indicated, singular elements may be in plural and vice versa with no loss of generality. In the drawings, like numerals refer to like parts through several views.

The various embodiments disclosed herein provide a distributed communication between operating system guests (hereinafter guests or a guest) of virtual machines in a virtual environment. The embodiments are facilitated in a system comprised of a plurality of hosts, wherein each host executes the operating systems of one or more guests. The guests are connected by a virtualized network formed by means of a distributed network element. In one embodiment, the virtualized network is an overlay network. At least a subset of the guests may be connected via the virtualized network that is unique to the subset of the guests, thereby allowing such guests to communicate over an overlay network without being aware of either the physical network, or of other guests that are not members of the virtualized network.

According to various exemplary embodiments, the virtualized network comprises a distributed network switch having at least a communication port for each guest, each such communication port being communicatively coupled to the other communication ports of the distributed switch. Each host executes the portion of the switch independently of the other hosts, but with awareness thereof. Therefore, the distributed network switch enables hosts to dynamically establish communication over the virtualized network between guests belonging to the virtualized network.

FIG. 1 is an exemplary and non-limiting schematic diagram of an embodiment of a system 100 having a distributed network element 120 according to one embodiment. A plurality of hosts $H_1$ 110-1, $H_2$ 110-2, through $H_N$ 120-N, execute respectively the operating systems of guests $G_1$ 130-1, $G_2$ 130-2, through $G_N$ 130-N respectively. It should be further understood that each host 110 may be, in one embodiment, a physical machine that executes one or more virtual machines (VMs) of one or more hosts, over which one or more guests are executed.

According to the one embodiment, a respective host 110, for example $H_1$ 110-1, provides a communication port, for example communication port $P_1$ 120-1, to the guest, for example, guest $G_1$ 130-1, such that the guest 130-1 may communicate with other guests using its respective communication guest port. The collection of communication guest ports, i.e., communication guest ports $P_1$ 120-1, $P_2$ 120-2, through $P_N$ 120-N, in combination constitute a distributed network element 120.

According to one embodiment, the control logic of the element 120 is distributed to each of the communication ports $P_1$ 120-1 through $P_N$ 120-N so that the switching functionality occurs in a distributed manner. Therefore, when a guest, for example $G_1$ 130-1, wishes to communicate with another guest, for example $G_2$ 130-2, the communication involves communication guest ports (hereinafter "guest ports") $P_1$ 120-1 and $P_2$ 120-2 that perform a distributed switching functionality. Below there is provided additional detail of how this is performed.

It should be noted that in addition to an exemplary case discussed above where a single guest $G_1$ 130-1 is executed on a host $H_1$ 110-1, a plurality of guests may similarly be executed on a single host, e.g., $H_1$ 120-1.

The hosts 110 communicate using a physical network 140, which may include, for example, a local area network (LAN), a wide area network (WAN), a metro area network (MAN), the Internet, the worldwide web (WWW), and the like, whether wired or wireless, and any combination thereof.

The hosts 110 are physically connected through communication ports of network interface cards (NICs) installed in the hosts 110 that enable each host to communicate with other hosts. Each host 110 provides one or more communication ports, i.e., simulated network cards (NIC), to one or more of its guests. Specifically, each communication port provided to a guest is a virtual instance of the NIC of the respective host.

As depicted in FIG. 1, the distributed network element 120 includes a plurality of guest ports P1 120-1 through PN 120-N which are virtual instances of the NICs installed in the host. It should be appreciated that a NIC is a hardware component, thus the NICs provide the hardware layer of the distributed network element 120.

According to the disclosed embodiments, a host runs the logic of its guest ports in a distributed way and independent of each of the other guest ports, and thereby operates the distributed network element 120 as further discussed with reference to FIG. 2. For example, the host $H_1$ 110-1 runs the logic of the guest port $G_1$ 130-1, independently of the logic of the guest port $G_2$ 130-2. The distributed network element 120 may be operated as a distributed router, a distributed switch, any other type of network element without departing from the principles of the invention. The distributed network element 120 in any configuration runs over the hardware layer of the hosts such that their guests are part of the virtualized network.

Figure 2:
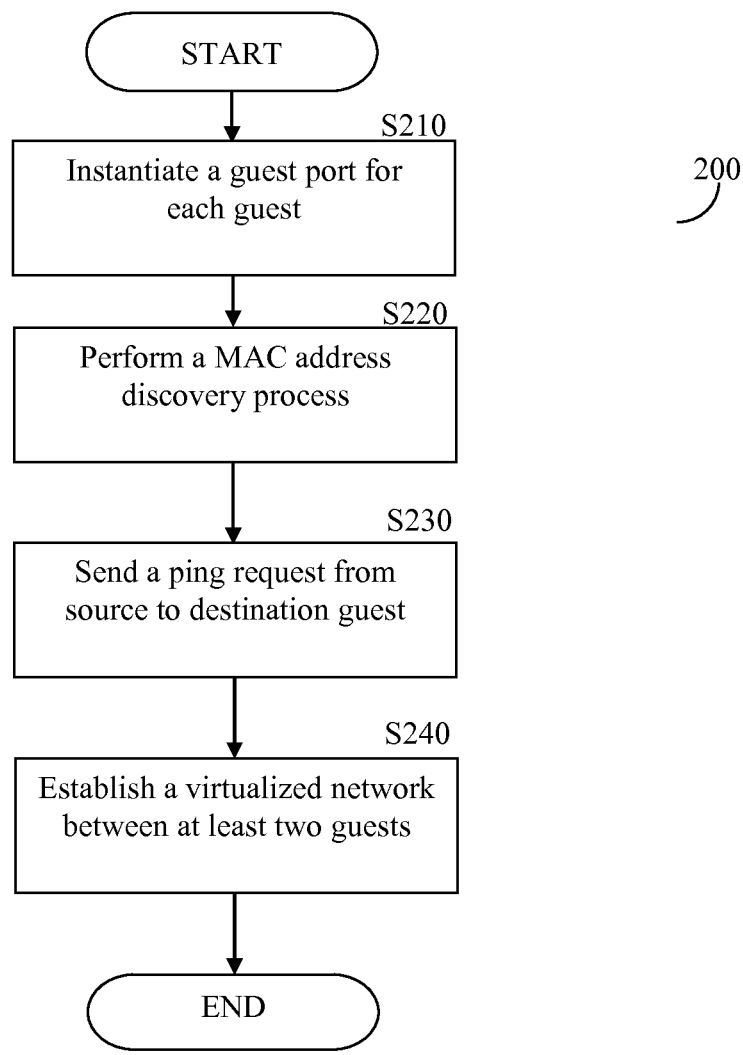
FIG. 2 is a flowchart illustrating the operation of a distributed network element according to one embodiment.

FIG. 2 shows an exemplary and non-limiting flowchart 200 illustrating the operation of the distributed network element 120 implemented according to one embodiment. The following will be described with a reference to a non-limiting switching example where a guest $G_1$ 130-1 tries to ping a guest $G_2$ 130-2.

The communication between the guests executed on different hosts, is performed through a virtualized network formed over the physical network 140. The packets' routing within the virtualized network is facilitated by means of the distributed network element 120. The communication layer between the guests is layer 2 of the standard seven layer model, i.e., the media access control (MAC) layer.

In S210, a guest port is instantiated for each guest virtually connected to the element 120. A guest port is an instance of a NIC on a respective host. For example, $P_1$ 120-1 and $P_2$ 120-2 are guest ports instantiated for guest $G_1$ 130-1 and $G_2$ 130-2 respectively, which are executed over hosts $H_1$ 110-1 and $H_2$ 110-2.

In S220, a MAC address discovery process takes place where a source guest tries to discover the MAC address of each guest port with which communication should be established. With this aim, the source guest sends an address resolution protocol (ARP) packet to discover the MAC address of each destination guest. For example, to establish a communication between $G_1$ 130-1 and $G_2$ 130-2, $G_1$ 130-1 sends through its respective guest port $P_1$ 120-1, an ARP packet. The ARP packet is a broadcast packet. The host $H_1$ 110-1 (in particular its NIC) tunnels the packet received via $P_1$ 130-1 to hosts $H_2$ 110-2 through $H_N$ 110-N, i.e., by broadcasting the ARP packet to all the instantiated guest ports (e.g., ports $P_2$ 130-2, $P_N$ 130-N shown in FIG. 1).

Each host delivers the ARP packet to their respective guest while the hosts receiving the ARP packet learn of the MAC address of the source guest (e.g., guest $G_1$ 130-1). In response to the ARP packet, each destination guest replies with an ARP reply including at least its MAC address. The ARP reply is addressed to the source guest. For example, $G_2$ 130-2 replies with an ARP reply packet designated to $G_1$ 130-1. The ARP reply is tunneled by means of the host of the destination guest (e.g., host $H_2$ 110-2) to the source host (e.g., host $H_1$ 110-1). It should be noted that the ARP reply is not a broadcast packet. The source host (and in particular its NIC) learns the MAC address of each destination guest, through the received ARP replies, and then transfers the received replies to the source guest. For example, the host $H_1$ 110-1 learns the MAC address of the host $G_2$ 130-2 and delivers the ARP packet to the guest $G_1$ 130-1.

In S230, once the guests are identified, the destination guest can ping any of the identified guests. For example, guest $G_1$ 130-1 can send a ping request which is delivered to the guest $G_2$ 130-2. It should be noted that any communication, in a form of packets, messages, requests, and the like, are tunneled through guest ports and the NICs of the respective source hosts, and therefrom to NICs and respective guest ports instantiated for destination guests. For example, the ping request is tunneled from the host $H_1$ 110-1 to host $H_2$ 110-2 through the respective guest ports $P_1$ 120-1 and $P_2$ 120-2. As information moves through the respective hosts and guests the information is kept therein for future use, so that when a guest needs to communicate with another guest it will not be necessary to again go through the entire discovery process described hereinabove.

In S240, a virtualized network is established to connect the source guest with the one or more destination guests. The endpoints of the virtualized network are guest ports instantiated for the guests. Once the virtualized network is formed, guests can communicate between themselves. For example, packets can flow over the virtualized network created between the guest $G_1$ 130-1 and the guest $G_2$ 130-2. In one embodiment, the virtualized network is an overlay network over the physical network 140 connected between the respective hosts (e.g., host $H_1$ 110-1 and $H_2$ 110-2) that host the guests (e.g., guest $G_1$ 130-1 and $G_2$ 130-2).

Therefore, according to the embodiments disclosed herein, a distributed collection of communication guest ports instantiated for respective guests executed over respective hosts are identifiable for the purpose of creating a virtualized network over a physical network. The virtualized network can be realized, for example, as an overlay network. The virtualized network enables communication between guests, while the guests are unaware of the actual physical network utilized for the purpose of communication. Therefore, the source guest does not need to acquire the physical networking addresses (e.g., MAC address, IP address, etc.) of the host hosting the destination guest. Rather, as discussed above, the source guest needs to identify only the guest ports of its destination guests. The guest ports are part of the distributed network element 120.

It should be appreciated that the distributed network element and its operation as discussed herein, would provide significant benefits as it is possible to define virtualized networks for guests executed on hosts without the need to be involved with the physical layer of the communication, thus simplifying the ability of users to create such virtualized environments, for example, using one or more cloud-based infrastructures as discussed below.

It should be understood that according to the disclosed embodiment, each guest and each communication guest port is configured to learn over time the addresses of the guests on the virtualized network. Therefore, the disclosed embodiments allow for a dynamic behavior of the virtualized network as guests are added or removed from the virtualized network.

According to one embodiment, the hosts are aware of the identifier (e.g., MAC address) of one or more of the guest ports 120-1, 120-N of the distributed network element 120. To this end, the hosts may be initially configured with the guest ports' identifier or later set with guest ports' identifiers when new ports are instantiated and/or new hosts are added.

Furthermore, according to one embodiment, when packets are transferred over the physical network 140 tunneling is used. Therefore, the packets are encapsulated to fit the requirements of the physical network 140. The packet encapsulation therefore enables guests that are unaware of the other guest ports' identifiers (e.g., MAC addresses) to learn of the identifiers of the guest ports and the topology of the entire virtualized network. Therefore, guests by processing packets, received at their receptive guest ports, can identify other guests and guest ports that are part of the distributed network element 120. This allows guests to join the virtualized network as needed. It should be noted that a subset of guests can form their own virtualized network to allow communication only among themselves.

The distributed network element 120 as discussed herein also enables effective communication performed over cloud-based infrastructures. That is, if one guest is executed on a first host operative in a first cloud-based infrastructure and a second guest is executed on a second host operative in a second-based infrastructure, that is separate and independent of the first cloud, a virtualized network between the first guest and the second guest can be created using the distributed network element. Moreover, the teachings herein are not limited to a network element and are equally applicable for example, and without limitation, to a network router.

It should be noted that the creation of the virtualized network as discussed above allows connecting between two or more guests hosted by hosts (i.e., separate computing devices) that are connected by the physical network 140. Thus, the hosts are also connected over the virtualized network by the means of the distributed communication element 120. Additional hosts (computing devices) may also become part of the virtualized network using the distributed communication element 120. This is achieved by instantiating one or more guest ports for each new added host for communication with the other guest ports, thereby extending the distributed communication element 120. As the switching logic of each port is run on each host independent of each other, scalability of the computing system is achieved. Moreover, the topology of the virtualized network may be different from the physical network.

The embodiments of the invention disclosed herein can be implemented as hardware, firmware, software, or any combination thereof. Moreover, the software is preferably implemented as an application program tangibly embodied on a program storage unit or tangible computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The memory may be a volatile memory, non-volatile memory or any combination thereof. The computer platform may also include an operating system and microinstruction code. The various processes and functions described herein may be either part of the microinstruction code or part of the application program, or any combination thereof, which may be executed by a CPU, whether or not such computer or processor is explicitly shown. In addition, various other peripheral units may be connected to the computer platform such as an additional data storage unit and a printing unit. All or some of the servers maybe combined into one or more integrated servers. Furthermore, a non-transitory computer readable medium is any computer readable medium except for a transitory propagating signal. The display segments and mini-display segments may be shown on a display area that can be a browser or another other appropriate application, either generic or tailored for the purposes described in detail hereinabove. Furthermore, a non-transitory computer readable medium is any computer readable medium except for a transitory propagating signal.

All examples and conditional language recited herein are intended for pedagogical purposes to aid the reader in understanding the principles of the invention and the concepts contributed by the inventor to furthering the art, and are to be construed as being without limitation to such specifically recited examples and conditions. Moreover, all statements

What we claim is:

1. A system for enabling effective communicating over cloud-based infrastructures, comprising:
 a first host operative in a first cloud-based infrastructure, wherein the first host executes a first guest operating system;
 a first communication port instantiated for the first guest;
 a second host operative in a second cloud-based infrastructure, wherein the second host executes a first guest operating system, wherein each of the first host and the second host include at least a network interface card (NIC); and
 a second communication port instantiated for the second guest, wherein the first guest operating system is configured to discover an identifier of the second communication port of the second guest operating system using an address discovery protocol;
 wherein the first host and second host are communicatively connected through a physical network,
 wherein the first communication port and the second communication port are communicatively connected to constitute a distributed communication element that enables a virtualized network for communication between the first guest and the second guest via the first communication port and the second communication port respectively,
 wherein the control logic of the distributed communication element is distributed to each of the first and second communication ports of the respective first host and second host to execute a respective portion of the switching functionality of the distributed communication element in a distributed manner independently of each other.

2. The system of claim 1, wherein at least one of the first host and the second host executes a virtual machine (VM).

3. The system of claim 1, wherein each of the first communication port and the second communication port is an instance of a NIC of the respective host executing the guest of the respective communication port.

4. The system of claim 1, wherein the virtualized network is an overlay network.

5. The system of claim 1, wherein the at least first guest causes an establishment of the virtualized network.

6. The system of claim 5, wherein the first guest sends a broadcast address resolution protocol (ARP) packet via the first communication port of the first host to discover a media access control (MAC) address of the second guest, wherein the ARP packet is tunneled via the physical network.

7. The system of claim 6, wherein the second guest and the second communication port learn the MAC address of the first guest communication port using the received ARP packet.

8. The system of claim 7, wherein the second guest provides a reply ARP packet to the first guest, wherein the reply ARP packet is tunneled via the physical network to the first guest via the first communication port.

9. The system of claim 8, wherein the first guest and the first communication port learn a MAC address of the second guest communication port provided in the reply ARP packet.

10. The system of claim 1, wherein the physical network comprises at least one of: a local area network (LAN), a wide area network (WAN), a metro area network (MAN), Internet, World Wide Web (WWW), a wired network, and a wireless network.

11. A distributed network element, comprising:
 a plurality of communication ports instantiated for a plurality of guest operating systems executed over a plurality of hosts, wherein each of the plurality of guest operating systems configured to discover the instantiated guest communication port of another guest operating system using an address discovery protocol, wherein the plurality of hosts are communicatively connected to a physical network, and wherein the plurality of communication ports enable establishment of a virtualized network between the plurality of guests, wherein each of the plurality of hosts is configured to execute a respective portion of the distributed communication element independently of each other.

12. The distributed network element of claim 11, wherein the distributed network element is any one of: a distributed network switch and a distributed network router.

13. The distributed network element of claim 11, wherein the physical network comprises at least one of: a local area network (LAN), a wide area network (WAN), a metro area network (MAN), Internet, World Wide Web (WWW), a wired network, and a wireless network.

14. The distributed network element of claim 11, wherein each of the plurality of hosts executes at least one a virtual machine (VM), and wherein at least one guest of the plurality of guests is executed by the at least one VM on a respective host.

15. The distributed network element of claim 11, wherein each of the plurality of hosts includes at least a network interface card (NIC).

16. The distributed network element of claim 15, wherein each of the plurality of communication ports is an instance of a NIC of a respective host executing an instance of a communication port for the respective guest.

17. The distributed network element of claim 11, wherein the virtualized network is an overlay network.

18. The distributed network element of claim 11, wherein the establishment of the virtualized network further comprises:
 performing a discovery media access control (MAC) address process of at least one destination guest by a source guest;
 sending a ping request from the source request to the at least one destination guest; and
 creating the virtualized network to allow communication between the source guest with the least one destination guest.

19. The distributed network element of claim 18, wherein the MAC discovery process further includes:
 broadcasting an address resolution protocol (ARP) packet to each of the at least one destination via the respective communication port instantiated for the respective guest, wherein each of the at least one destination ports learns a MAC address of the source guest port using the received ARP packet.

20. The distributed network element of claim 19, wherein each the of the at least one destination guest provides a reply ARP packet to the source guest, wherein the ARP reply is tunneled via the physical network to the source guest via the communication port instantiated for the source guest, wherein the first guest identifies the at least one destination guest using its respective MAC address of the source guest communication port provided in the reply ARP packet.

21. A non-transitory computer readable medium having stored thereon instructions for causing one or more processing units to execute the method of claim 19.

22. A method for operating a virtualized network that communicatively connects between a plurality of communication ports, instantiated for a plurality of guest operating systems executed over a plurality of hosts, comprising:
  instantiating a communication port for each of the plurality of guests;
  performing a discovery media access control (MAC) address process of at least one destination guest communication port identifier of the plurality of guests by a source guest by broadcasting an address resolution protocol (ARP) packet to each of the at least one destination via the respective communication port instantiated for the respective guest;
  sending a ping request from the source request to the at least one destination guest; and
  creating the virtualized network to allow communication between the source guest with the at least one destination guest, wherein the virtualized network is created over the physical network through a distributed communication element, and
  wherein the control logic of the distributed communication element is distributed to each of the respective communication ports instantiated for the respective guest to execute a respective portion of the switching functionality of the distributed communication element in a distributed manner independently of each other.

23. The method of claim 22, wherein each of the plurality of hosts includes at least a network interface card (NIC).

24. The method of claim 22, wherein each of the plurality of communication ports is an instance of a NIC of a respective host executing an instance of a communication port for the respective guest.

25. The method of claim 22, wherein each of the at least one destination ports learns a MAC address of the source guest port using the received ARP packet.

26. The method of claim 25, wherein each of the at least one destination guest provides a reply ARP packet to the source guest, wherein the ARP reply is tunneled via the physical network to the source guest via the communication port instantiated for the source guest, wherein the first guest identifies the at least one destination guest using its respective MAC address provided in the reply ARP packet.

* * * * *